July 19, 1966     D. GIGNOUX     3,261,317

METHOD AND VESSEL FOR DEEP DIVING

Filed July 27, 1964     2 Sheets-Sheet 1

INVENTOR
DOMINIQUE GIGNOUX

BY Semmes and Semmes
ATTORNEYS

July 19, 1966 D. GIGNOUX 3,261,317
METHOD AND VESSEL FOR DEEP DIVING
Filed July 27, 1964 2 Sheets-Sheet 2

INVENTOR
DOMINIQUE GIGNOUX
BY Semmes & Semmes
ATTORNEYS

United States Patent Office 3,261,317
Patented July 19, 1966

3,261,317
METHOD AND VESSEL FOR DEEP DIVING
Dominique Gignoux, Washington, D.C., assignor to Cosmic, Inc., Washington, D.C., a corporation of Delaware
Filed July 27, 1964, Ser. No. 385,256
6 Claims. (Cl. 114—16)

The invention disclosed herein relates to a method and vessel for deep diving, and in particular to a novel hull construction utilizing glass as a component material.

For some time, glass has shown major promise as a structural material for deep diving vessels. It is well known that such glass withstands compression better than most construction materials and, in particular, steel or titanium which are presently used in deep-submergence vessels. In general, it may be said that a glass structure weighing about ½₀ of that of a corresponding steel structure will withstand the same compression force. However, since glass is notoriously poor at withstanding tension, it is obviously vulnerable to shock, particularly underwater shock. It is, however, universally recognized that if the glass is subjected to a compression force of substantial magnitude, a subsequent tension force at a particular point resulting from shock will be subtracted from or compensated by the pre-existing compression, thus, preventing fracture. Contrary to other materials glass exhibits "depth hardening" characteristics not unlike those characteristics obtainable from pre-stressing. The idea of using a glass hull in conjunction with deep diving vessels has, for example, been suggested in the June 8, 1964, issue of Aviation Week and Space Technology, at page 91.

Accordingly, it is an object of invention to provide a method and vessel for deep diving capable of withstanding greater underwater pressures than presently available.

Another object of the present invention is to provide a method and vessel for deep diving wherein a hull construction capable of withstanding greater underwater pressures than presently available is utilized.

Another object of the present invention is to provide deep diving vessels with a hull construction utilizing glass as a construction material.

A further object of the present invention is to provide deep diving vessels with a hull construction capable of resisting pressures at great depth wherein glass is used in conjunction with metal to obtain the combined benefit of the maximum compression and tension resistance characteristics of each.

Yet additional objects of invention will become apparent from the ensuing specification and attached drawings which illustrate the deep diving vessel employing the novel combined pre-stressed glass and metal hull wherein.

Figure 1:
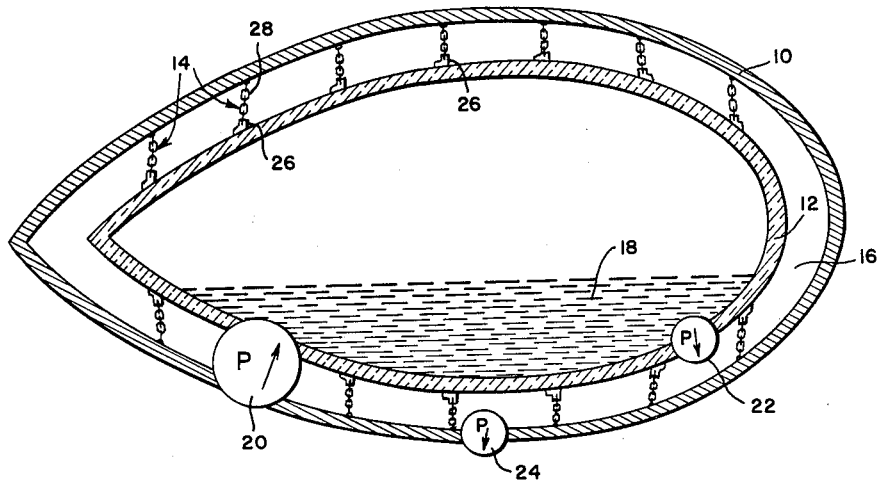
FIGURE 1 is a side elevation in section illustrating the combined use of pre-stressed glass metal in the hull construction.

The novel deep diving vessel constituting the subject matter of this application consists of an outer metal hull 10, an inner glass hull 12, a plurality of resiliently biased connection assemblies 14 for suspending inner glass hull 12 within outer metal hull 10, an outer ballast tank 16, an inner ballast tank 18, and pumping assemblies 20, 22 and 24.

As seen in FIGURE 1, inner glass hull 12, is resiliently suspended within outer metal hull 10 with the use of a plurality of resiliently biased connection assemblies 14. Each connection assembly 14 consists of a metal ring 26 attached to inner glass hull 12 and a chain 28 having one end secured to outer metal hull 10 by welding or any other suitable means and a second end attached to metal rings 26 around inner glass hull 12. In this manner, outer metal hull 10 may yield to compression and tension forces being exerted thereon without transmitting such force and resulting displacement to inner glass hull 12. It is obvious that the disclosed connection assemblies 14 may be replaced with any suitable connection assembly and particularly any refined assembly capable of providing the necessary sensitive, resilient biasing effect.

As also seen in FIGURE 1, the space between outer metal hull 10 and inner glass hull 12 defines an outer ballast tank 16. Also, an inner ballast tank 18 is located within inner glass hull 12 and defined by any conventional structure (not shown).

Pumping assemblies 20, 22 and 24 are illustrated in FIGURE 1 and are used for transmitting water to and from outer ballast tank 16 and inner ballast tank 18, as described hereinafter.

When the deep diving vessel is on the surface, both ballast tank 16 and ballast tank 18 are filled with air at approximately one atmosphere of pressure. Descent is initiated with pump 20 being actuated thus causing water to pass from the outside to inner ballast tank 18. At this stage, the vessel will submerge and navigate at relatively shallow depths not exceeding approximately 1000 feet. Greater submersion is achieved by actuating pump 22 which removes the water from inner ballast tank 18 to outer ballast tank 16. Since the capacity of inner ballast tank 18 is greater than that of outer ballast tank 16, outer ballast tank 16 will be completely filled. At this point, with the use of appropriate valve and venting structure (not shown), the pressure inside outer ballast tank 16 is equalized to that of the outside environment. Thus, the outer metal hull 10 is submitted to equal ambient pressure on both sides thereof and the only "active" hull is the inner glass hull 12, thus permitting the vessel to dive to the maximum depth permitted by the characteristics of inner glass hull 12. The depth of penetration of the vessel, of course, subjects inner glass hull 12 to compressive forces resulting in the "pre-stressed" or "depth hardening" characteristics referred to above. Such pre-stressure then enables the glass to withstand shock by absorbing the tension forces.

Figure 2:
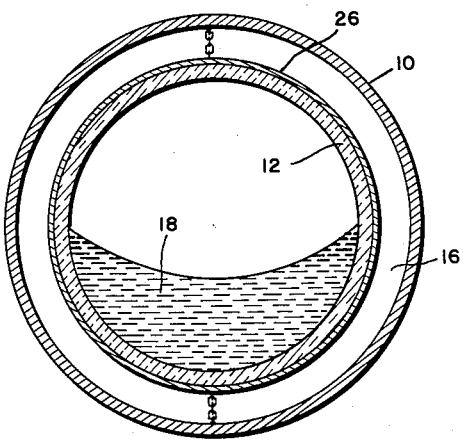
FIGURE 2 is a cross-sectional view taken near the mid-portion of FIGURE 1.
Figures 3, 4:
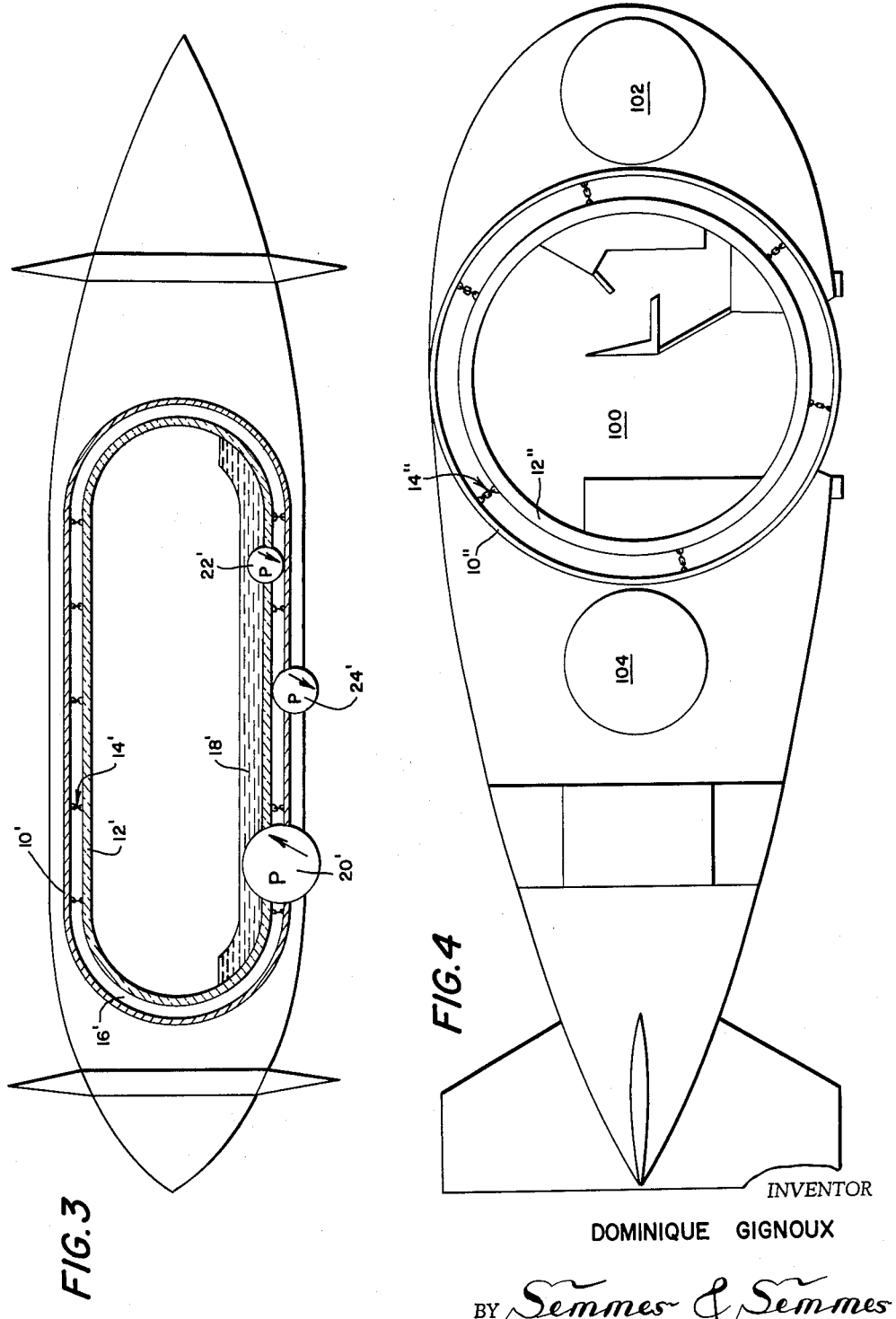
FIGURE 3 is a side elevation in section illustrating the combined use of glass and metal in a modified hull construction.
FIGURE 4 is a side elevation in section illustrating the combined use of glass and metal in a modified hull construction utilizing three spherical members, two of these acting as inner ballast tanks.

FIGURE 3 discloses a first application of the broad concept of using glass and metal, as shown in FIGURES 1 and 2, in a deep-diving vessel of cylindrical configuration. As clearly seen, the outer metal hull 10' and inner glass hull 12' enclose only the "working" compartment of the vessel. The connection assemblies 14' consist of titanium rings and outer hull supports. Pumping assemblies 20', 22' and 24' are used in this same manner as shown in FIGURES 1 and 2 and transmit water to and from outer ballast tank 16' and inner ballast tank 18'.

FIGURE 4 discloses a second application of the pre-stressed glass and metal hull construction of FIGURES 1 and 2, wherein three spherical enclosures 100, 102 and 104 are employed. In particular, spherical member 100 consists of outer metal hull 10'' and inner glass hull 12'' resiliently biased in spaced relationship by a plurality of connection assemblies 14'' which have been previously described in detail. Spherical member 100 defines the "control" compartment occupied by the crew of the vessel. Auxiliary spheres 102 and 104 act as inner ballast tanks and perform the same function as inner ballast tanks 18 and 18' of FIGURES 1 and 3 respectively. No constructional details are shown on the drawing for the sake of clarity, but the actual construction of the auxiliary spheres is the same as that of spherical member 100 in that it utilizes a glass sphere within a metal sphere. Thus, the embodiment of FIGURE 4 is designed to have no ballast inside spherical member 100 which is occupied by the crew or passengers.

Manifestly, still further modifications and refinements of the novel deep diving vessel may be employed without departing from the scope of invention, as defined by the subjoined claims.

I claim:
1. A deep diving vessel, comprising:
   (A) an outer metal hull;
   (B) an inner glass hull defining a space therebetween; and
   (C) connecting means for suspending said inner glass hull within said outer metal hull in spaced relationship, said connecting means including a plurality of chains having one end attached to said outer metal hull and the other end thereof attached to said inner glass hull.
2. A deep diving vessel as in claim 1, including a first pumping system connecting the interior of said inner glass hull with the outside of said outer metal hull.
3. A deep diving vessel as in claim 2, including a second pumping system interconnecting the interior of said inner glass hull with said space between said inner glass hull and said outer metal hull.
4. A deep diving vessel as in claim 3, including a third pumping system interconnecting said space between said outer metal hull and said inner glass hull with the outside of the said outer metal hull.
5. A deep diving vessel, comprising:
   (A) an outer metal hull;
   (B) an inner glass hull spaced within said outer metal hull and defining therebetween an outer ballast tank;
   (C) an inner ballast tank located within said inner glass hull;
   (D) connecting means for resiliently biasing said inner glass hull within said outer metal hull;
   (E) a first pumping assembly means connected to said inner glass hull and said outer metal hull, said first pumping assembly means defining a controlled passage-way between said inner ballast tank and the outerside of said outer metal hull;
   (F) a second pumping assembly means located within said inner glass hull and providing controlled communication between said inner ballast tank and said outer ballast tank; and
   (G) a third pumping assembly means located within said outer metal hull and providing controlled communication between said outer ballast tank and the outside of said outer metal hull.
6. A method for submerging a deep diving vessel of the type having an inner glass hull resiliently suspended within an outer metal hull and defining an outer ballast tank therebetween and an inner ballast tank located within said inner glass hull, comprising the steps of:
   (A) introducing water into said inner ballast tank;
   (B) removing said water from said inner ballast tank to said outer ballast tank to equalize the pressure within said outer ballast tank and the pressure outside said metal hull at a particular depth of submersion;
   (C) continually regulating the flow of water from said inner ballast tank to said outer ballast tank to maintain said water within said outer ballast tank at a pressure equal to the pressure of water outside said outer metal hull as the depth of submersion varies.

References Cited by the Examiner
UNITED STATES PATENTS

|           | 4/1819  | Fahnestock   | 220—9  |
|-----------|---------|--------------|--------|
| 988,632   | 4/1911  | D'Equevilley | 114—16 |
| 3,112,724 | 12/1963 | Rosen        | 114—16 |

FOREIGN PATENTS 526,759 6/1931 Germany.

OTHER REFERENCES

"The Society of Naval Architects and Marine Engineers," Transactions 1963, pages 228, 229 and 234.

MILTON BUCHLER, Primary Examiner.

T. M. BLIX, Assistant Examiner.